United States Patent [19]
Savovic et al.

[11] Patent Number: 5,360,499
[45] Date of Patent: Nov. 1, 1994

[54] METHOD FOR POSITIONING AN OBJECT RELATIVE TO A STRUCTURAL MEMBER

[75] Inventors: Niko M. Savovic, Sunrise; Willard F. Amero, Jr., Plantation; Raymond J. Kleinert, III, Ft. Lauderdale; Michael M. Austin, Pompano Beach; Russell E. Gyenes, Sunrise, all of Fla.

[73] Assignee: Motorola, Inc., Schaumburg, Ill.

[21] Appl. No.: 131,237

[22] Filed: Oct. 4, 1993

[51] Int. Cl.$^5$ .................................................. B32B 31/16
[52] U.S. Cl. .................... 156/73.1; 156/290; 156/292; 264/23
[58] Field of Search .................. 156/73.1, 290, 292, 156/580.1; 264/23; 425/174.2

[56] References Cited

U.S. PATENT DOCUMENTS

| | | | |
|---|---|---|---|
| 4,169,751 | 10/1929 | Yen | 156/73.1 |
| 4,795,511 | 1/1989 | Wouters | 156/73.1 |
| 5,049,274 | 9/1991 | Leason et al. | 210/445 |
| 5,073,116 | 12/1991 | Siegel et al. | 156/73.3 |

OTHER PUBLICATIONS

Branson Ultrasonics Corp. 1986, Ultrasonic Plastic Assembly "Ultrasonic Process" pp. 1–3, revised Aug. 1990.

Branson Ultrasonics Corp. 1979, Ultrasonic Plastics Assembly "Welding" pp. 33–38.

Primary Examiner—Michael W. Ball
Assistant Examiner—J. Sells
Attorney, Agent, or Firm—Andrew S. Fuller

[57] ABSTRACT

A method is provided for positioning an object (133) relative to a structural member (103). The method includes providing a first and second member (103, 113), a positioning member (123) with a first end (126) and a second end (124), and the object (133). The first end (126) is positioned proximal to the object (133), and a first energy director (107) is positioned between, and is in contact with, the first end (126) and the first member (103). A second energy director (125), having a slower characteristic melting rate than that of the first energy director (107), is positioned between, and is in contact with, the second end (124) and the second member (123). Energy is first imparted to cause at least one of the first and second energy directors (107, 125) to begin melting. Imparting the energy is discontinued after the first energy director (107) is substantially melted and the object (133) is properly positioned, while the second energy director (125) is not substantially melted.

17 Claims, 2 Drawing Sheets 5,360,499

METHOD FOR POSITIONING AN OBJECT RELATIVE TO A STRUCTURAL MEMBER

TECHNICAL FIELD

This invention relates generally to the relative positioning of an object with respect to a structural member, and more particularly to the relative positioning of structural attachments for a device.

BACKGROUND OF THE INVENTION

Manufacturers often attach multiple structural components, such as by welding, to form a single unit during the assembly of a device. In many of these devices, the internal components are protected by a housing often formed from plastic. These plastic housings may be welded together using ultrasonic welding techniques. Oftentimes, various components and attachments must be attached and positioned relative to various housing members. For example, electrical contacts used for the external electrical interfacing to an electrical device, are often mounted for external exposure through the device housing. These electrical contacts must be properly positioned with respect to the housing. However, there are several manufacturing issues related to the attachment and positioning of these electrical contacts within a device housing. One such problem is the variation of contact depth or height with respect to the housing.

In some existing devices, electrical contacts are positioned within the body of the device housing and are secured by features integral to the housing. One example is described in U.S. Pat. No. 5,006,073, issued to Mennona, Jr. on May 15, 1990, for a Snap Fit Contact Assembly, which discloses a device in which discrete electrical contacts are positioned using features formed within the device housing. With the trend toward smaller and lighter product designs, there has been a move toward a thinner and lighter housing, which in many cases causes the housing to be unsuitable for the attachment and positioning of the electrical contacts. Consequently, the attachment and positioning of the electrical contacts are aided by structures within the body of the device. This arrangement complicates the process of accurately and consistently positioning the electrical contacts with respect to the housing during the assembly of the device. Inconsistencies may arise from the stacked tolerances of the various elements within the device structure. The effect may be a variation in the presentation of the external electrical interface for the device. This can lead to a poor electrical contact when an attempt is made to interface the device with other external devices.

Therefore, there exists a need to attach, such as by welding, multiple structural components, such as external electrical contacts for an electrical device, with consistency in relative positioning. It is also desirable, to achieve this consistency without the use of additional piece parts. Consequently, a new attachment and positioning method is needed.

DETAILED DESCRIPTION OF THE EMBODIMENTS

Figure 1:
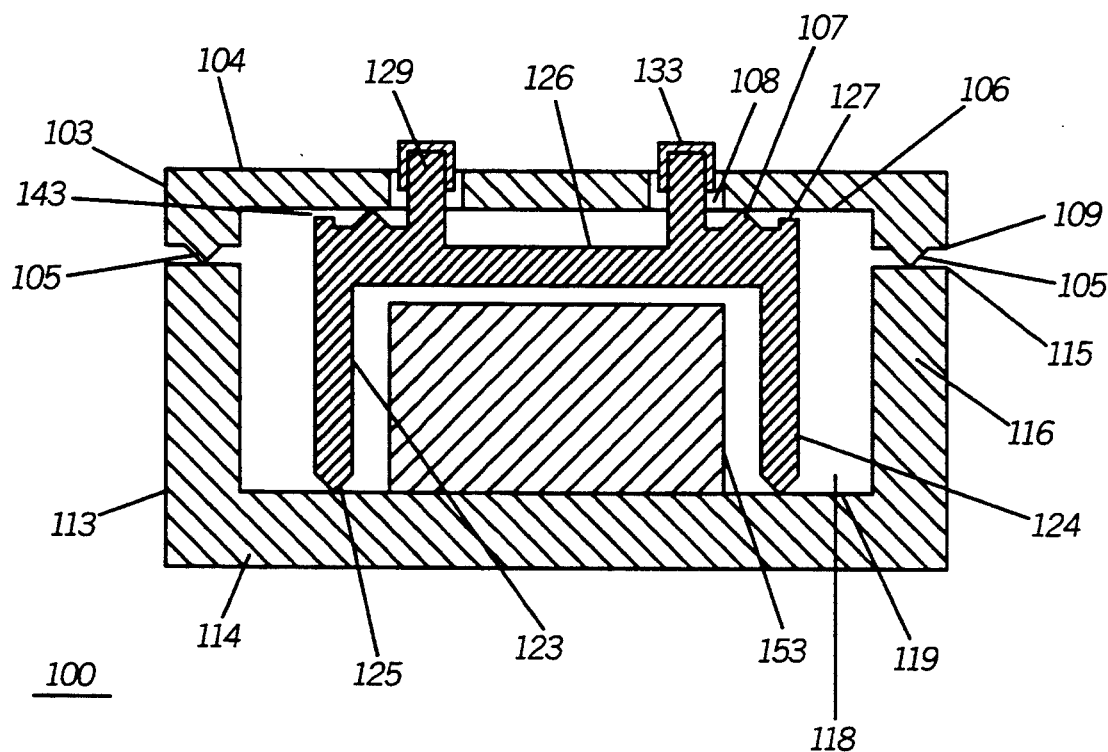
FIG. 1 is a cross-sectional view of the structure of a battery before welding is performed on the battery housing members, in accordance with the present invention.

A method is provided for positioning objects relative to a structural member. In the preferred embodiment, the objects are electrical contacts and the structural member is a battery housing member. FIG. 1 shows a cross-sectional view of a battery assembly 100 before its housing members 103, 113, 123 are welded together. The battery assembly 100, which is an electrical device, includes the battery housing having multiple housing members 103, 113, 123, a battery cell pack 153, and discrete electrical contacts 133 for providing an electrical interface between the battery assembly 100 and external devices (not shown). The electrical contacts 133 are electrically coupled to the cell pack, and the contacts 133 facilitate the flow of communications and electrical power between the battery assembly 100 and an external device (not shown).

The housing members 103, 113, 123 include a first housing member 103, a second housing member 113, and a positioning member 123 located between the first and second housing members 103, 113. Distributed on the positioning member 123, are a first and second set of energy directors 107, 125 of different sizes and corresponding characteristic melting rates, the significance of which will be described below. A third set of energy directors is present on the first housing member 103, at the interface between the first and second housing members 103, 113. The energy directors 105, 107, 125 are designed to absorb energy imparted to the structure for the purpose of welding, to permanently attach the housing members 103, 113, 123. In the preferred embodiment, the energy directors 105, 107, 125 are integral to the specific housing members 103, 123. However, it is consistent with the invention to have separate energy directors mounted between the housing members 103, 113, 123, or to have the energy directors on opposite housing members, or both.

In the preferred embodiment, the first and second housing members 103, 113 are formed from a plastic material, such as polycarbonate marketed under the trademark Lexan ™ SP1210 by the General Electric company. Both housing members 103, 113 are combined to form the outer casing of the battery housing. As such, the first housing member 103 has an interface portion 109 for mating with a similar interface portion 115 on the second housing member 113. The first housing member 103 has a substantially planar interior surface 106 and exterior surface 104 and functions as a cover for the second housing member 113. The third set of energy directors 105 is located on the interface portion 109 of the first housing member 103, between the first and second housing members 103, 113, and has a third characteristic melting rate. In addition, the first housing member 103 has apertures 108 extending there through to accommodate the positioning member 123 and the electrical contacts 133. The second housing member 113 has a planar member 114 having depending sidewalls 116 defining a compartment with an interior portion 118. The interior portion 118 accommodates the internal components of the battery assembly 100, such as the cell pack 153, and other related components (not shown) necessary to complete the battery assembly 100. The depending sidewalls 116 terminate to form the interface portions 115, which are complementary to those 109 of the first housing member 103.

The positioning member 123 is located between the first and second housing members 103, 113. The purpose of the positioning member 123 is to accurately and consistently position an object, such as the discrete electrical contact 133, relative to the exterior surface 104 of the first housing member 103, thereby presenting a consistent external electrical interface to the battery assembly 100. Thus, the positioning member 123 has a first end 126 having protrusions 129 extending therefrom, which are designed to support the electrical contacts 133. The positioning member is positioned between the first and second battery housing members, with the first end of the positioning member being proximal to the electrical contact to be positioned. The electrical contacts are affixed to the protrusions 129 which extend through the apertures 108 of the first housing member 103, thus allowing external access to the electrical contacts 133.

The first end 126 has the first set of energy directors 107 formed thereon. The first end 126 also has interface portions 127 for abutting the first housing member 103. These interface portions 127 together with the first set of energy directors 107, play an important role in the positioning of the electrical contacts 133. The positioning member 123 has a second end 124 having the second set of energy directors 125 formed thereon, with the corresponding second characteristic melting rate. This second characteristic melting rate is slower than the characteristic melting rate of the first set of energy directors 107. The positioning member 123 is positioned such that at least some of the first set of energy directors 107 contact the first housing member 103, and that the first end 126 is positioned proximal to the electrical contacts 133 to be positioned. Additionally, the position member 123 is positioned such that at least some of the second set of energy directors 125 are between the positioning member 123 and the second housing member 113, and which contact the second housing member 113. The integral energy directors 125 on the second end 124 of the positioning member 123 abuts the interior surface 119 of the second housing member 113 at the juncture where attachment is to be made.

Figure 2:
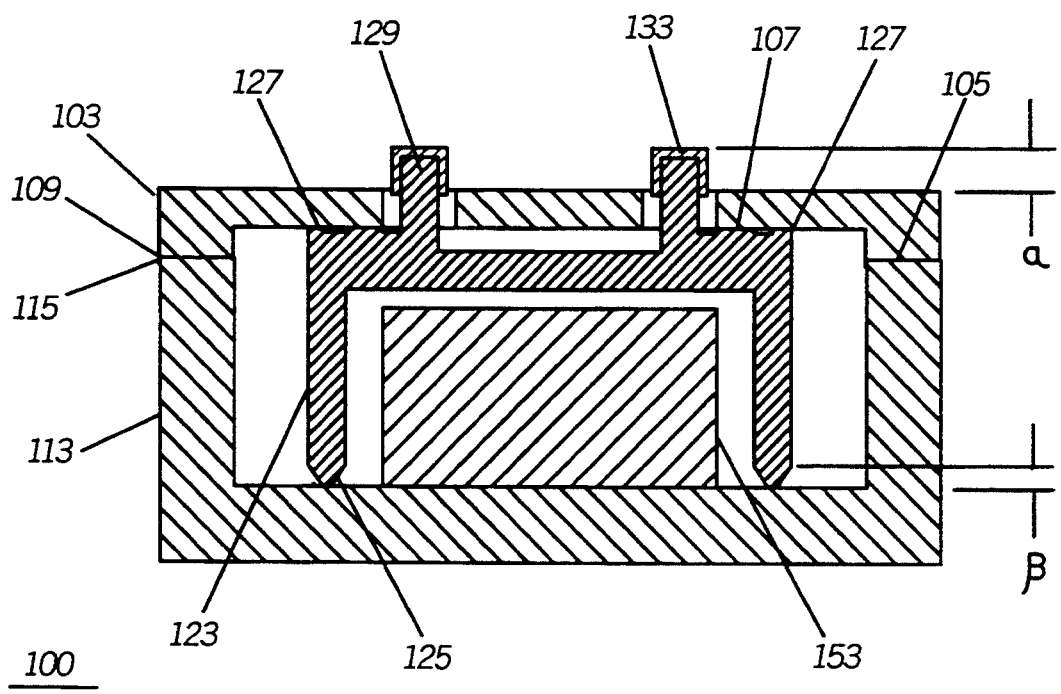
FIG. 2 is a cross-sectional view of the battery of FIG. 1, in which the battery housing members are welded together.

In the preferred embodiment, the first and second housing members 103, 113 are designed to be welded together at the respective interface portions 109, 115. Referring to FIG. 2, a cross-sectional view of the battery assembly 100 is shown having the housing members 103, 113, 123 welded together, in accordance with the present invention. To better understand the invention, the behavior of the housing members 103, 113, 123 and the energy directors 105, 107, 125 during the welding process will be described. Preferably, ultrasonic energy is applied to the housing members 103, 113, 123 to cause the first, second, and third set of energy directors 107, 125, 105 to begin melting. As the ultrasonic energy is being imparted, the various sets of energy directors 107, 125, 105 will melt at varying rates. The first set of energy directors 107, having a higher characteristic melting rate than the second set of energy directors 125, will melt faster, and will continue to melt until the interface portion 127 of the positioning member 123 abuts the interior surface 106 of the first housing member 103. Simultaneously, the other energy directors 105, 125 are also being melted, thereby creating a joint between the interface portions 109, 115 of the first and second housing members 103, 113, and between the second end 124 of the positioning member 123 and the interior surface 119 of the second housing member 113. The application of ultrasonic energy to the housing members 103, 113, 123 is discontinued after the interface portion 127 of the positioning member 123 abuts the interior surface 106 of the first housing member 103, and after the housing members 103, 113, 123 have been structurally attached. At this point, the first set of energy directors 107 have been substantially melted, while the second, and maybe the third set of energy directors 125, 105, have melted to a lesser degree. An analysis of the results of the welding operation further explains the concept embodied in the present invention.

Figure 3:
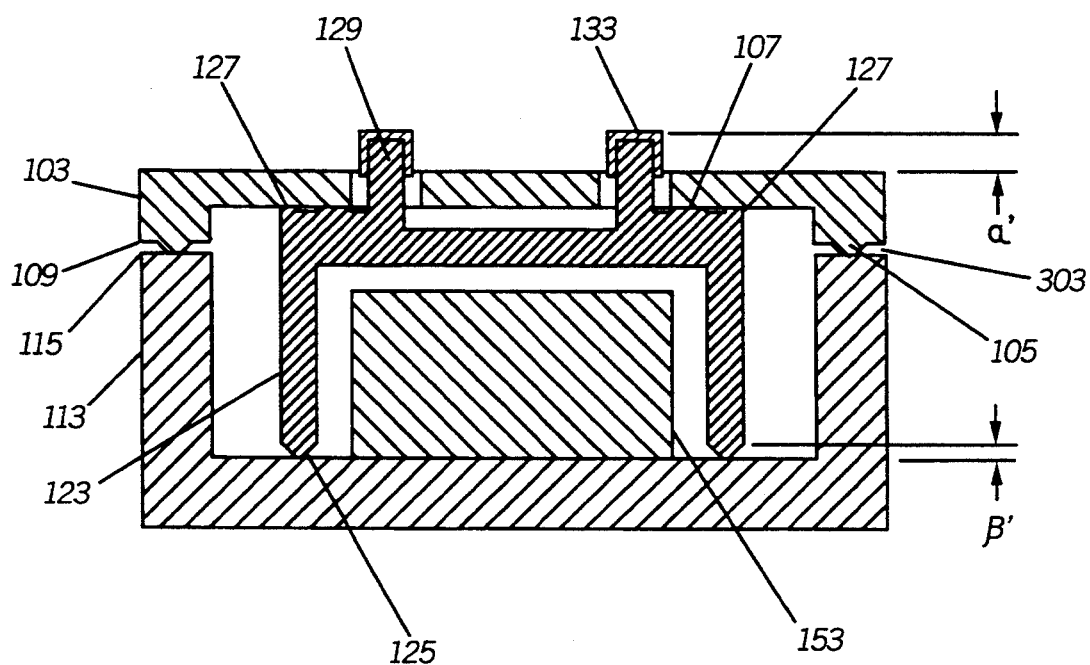
FIG. 3 is a cross-sectional view of the battery of FIG. 2, in which the battery housing members have different dimensions.

The welding operation results in the relative height of the electrical contacts 133 being alpha ($\alpha$). This height is determined in part by the height of the protrusions 129, the thickness of the first housing member 103, and the distance between the interface portion 127 on the first end 126 of the positioning member 123 and the interior surface 106 of the first housing member 103 (see gap 143 on FIG. 1). Other dimensional variations present between the housing members 103, 113, 123, which are within the dimensional tolerances, are accommodated through the process described by the invention. For example, after welding, the first and second housing members 103, 113 are tightly joined along the interface portions 109, 115. Correspondingly, the third set of energy directors 105 has substantially melted, and the second set of energy directors 105 has been partially melted, as indicated by the distance beta ($\beta$). Referring to FIG. 3, compare the results of a set of housing members for a second battery assembly 200 where each housing member 103, 113, 123 is within the tolerance limits, but where at least some housing members have dimension which vary from those of the first battery assembly 100. Structural and welding variations have resulted in a gap 303 between the first and second housing members 103, 113, and have caused a difference in the degree of melting of the second set of energy directors 125, characterized by the height beta prime ($\beta'$). However, assuming that the height of the protrusions 129 on the first end 126 of the positioning member 123, the thickness of the first housing member 103, and the separation between the interface of the first end 126 of the positioning member 123 and the first housing member 103 had remained constant, the contact height alpha ($\alpha$) does not change because of the other dimensional variations elsewhere in the housing members 103, 113, 123. One reason is that the difference in the characteristic melting rates among the various sets of energy directors 105, 107, 125 accounts for some degree of dimensional variations of the housing members 103, 113, 123. Herein lies a significant benefit of the present invention.

In summary a method is provided for positioning an object, such as an electrical contact 133, with respect to a structural member such as the first housing member 103, in which the object 133 is consistently and accurately positioned, while accommodating dimensional variations among the housing members 103, 113, 123. This method uses a positioning member 123 positioned proximal to the object 133, to position the object 133 relative to the first housing member 103. A first set of energy directors 107 and a second set of energy directors 125 having different characteristic melting rates are located between the positioning member 123 and the first and second housing members 103, 113 respectively. By imparting energy, such as ultrasonic energy, such that the first set of energy directors 107 is substantially melted before the second set of energy directors 125, and by discontinuing imparting energy after the first set of energy directors 107 has substantially melted, the object is properly positioned with respect to the first housing member 103. In the preferred embodiment electrical contacts 133 are accurately and consistently positioned with respect to a battery housing. A manufacturing process utilizing the present invention can accommodate varying tolerances without the use of additional parts or expenses and complicated setups.

What is claimed is:

1. A method for positioning an object relative to a structural member, comprising the steps of:
   A) providing a first and second member, the first member being the structural member relative to which the object is being positioned;
   B) providing a positioning member having a first end and a second end, wherein:
      i) the first end has at least one energy director formed thereon that has a first characteristic melting rate;
      ii) the second end has at least one energy director formed thereon that has a second characteristic melting rate, which second characteristic melting rate is slower than the first characteristic melting rate;
   C) positioning the positioning member such that:
      i) the at least one energy director of the first end contacts the first member and the first end is also positioned proximal to the object;
      ii) the at least one energy director of the second end contacts the second member;
   D) imparting energy to cause at least one of the energy directors to begin melting; and
   E) discontinuing imparting energy when the at least one energy director of the first end is substantially melted while the at least one energy director of the second end is not substantially melted.

2. The method for positioning an object relative to a structural member of claim 1 wherein the step of imparting energy to cause at least one of the first and second energy directors to begin melting includes the step of imparting ultrasonic energy.

3. The method for positioning an object relative to a structural member of claim 1, wherein the step of providing a first and second member includes the step of providing a third energy director between the first and second members.

4. The method for positioning an object relative to a structural member of claim 3 wherein the step of imparting energy further causes the energy director on at least one of the first and second members to begin melting.

5. A method for positioning an object relative to a member, comprising the steps of:
   A) providing a first and second member;
   B) providing a positioning member having a first end and a second end;
   C) positioning the positioning member such that the first end is positioned proximal to the object;
   D) positioning at least a first energy director having a first characteristic melting rate between the first end and the first member, such that the first energy director contacts both the first end and the first member;
   E) positioning at least a second energy director having a second characteristic melting rate, which second characteristic melting rate is slower than the first characteristic melting rate, between the second end and the second member, such that the second energy director contacts both the second end and the second member;
   F) imparting energy to cause at least one of the first and second energy directors to begin melting; and
   G) discontinuing imparting energy after the first energy director is substantially melted and the object is properly positioned, while the second energy director is not substantially melted.

6. The method for positioning an object relative to a member of claim 5 wherein the step of positioning at least a first energy director having a first characteristic melting rate between the first end and the first member includes the step of forming the first energy director on the first end of the positioning member.

7. The method for positioning an object relative to a member of claim 5 wherein the step of positioning at least a second energy director having a second characteristic melting rate between the second end and the second member includes the step of forming the second energy director on the second end of the positioning member.

8. The method for positioning an object relative to a member of claim 5 wherein:
   the step of positioning at least a first energy director having a first characteristic melting rate between the first end and the first member includes the step of forming the first energy director on the first end of the positioning member; and
   the step of positioning at least a second energy director having a second characteristic melting rate between the second end and the second member includes the step of forming the second energy director on the second end of the positioning member.

9. The method for positioning an object relative to a member of claim 5 wherein the step of imparting energy to cause at least one of the first and second energy directors to begin melting includes the step of imparting ultrasonic energy.

10. The method for positioning an object relative to a member of claim 5, wherein the step of providing a first and second member includes the step of providing a third energy director between the first and second members.

11. The method for positioning an object relative to a member of claim 10 wherein the step of imparting energy further causes the third energy director to begin melting.

12. A method for positioning an object relative to a member, comprising the steps of:
   A) providing a first and second member, wherein the object is to be positioned with respect to the first member, and at least one of the members has at least one energy director formed thereon;
   B) providing a positioning member having a first end and a second end, wherein:
      i) the first end has energy directors formed thereon that have a first characteristic melting rate;
      ii) the second end has energy directors formed thereon that have a second characteristic melting rate, which second characteristic melting rate is slower than the first characteristic melting rate;
   C) positioning the positioning member such that:

i) at least some of the energy directors of the first end contact the first member and the first end is positioned proximal to the object to be positioned;

ii) at least some of the energy directors of the second end contact the second member;

D) imparting melting energy to the energy directors to cause all of the energy directors to begin melting; and E) discontinuing imparting energy after the energy directors of the first end are substantially melted and the object is properly positioned, while the energy directors of the second end are not substantially melted.

13. The method for positioning an object relative to a member of claim 12 wherein the step of imparting melting energy includes the step of imparting ultrasonic energy.

14. A method for positioning an object relative to a housing member comprising the steps of:

A) providing a first housing member and a second housing member, wherein the object is to be positioned with respect to the first housing member, and at least one of the housing members has a first energy director formed thereon which contacts the other housing member, which first energy director has a first characteristic melting rate;

B) providing a positioning member having a first end and a second end, wherein:

i) the first end has a second plurality of energy directors having a second characteristic melting rate; and ii) the second end has a third of energy director having a third characteristic melting rate, wherein the third characteristic melting rate is slower than the second characteristic melting rate;

C) positioning the positioning member between the first and second housing members, with the first end of the positioning member being proximal to the object to be positioned;

D) applying ultrasonic energy to cause the first, second, and third energy directors to begin melting; and E) discontinuing the applying of ultrasonic energy after the first energy director has substantially melted and the object is properly positioned, while the second energy director has not substantially melted.

15. The method for positioning an object relative to a housing member of claim 14, wherein the first characteristic melting rate is faster than the third characteristic melting rate.

16. The method for positioning an object relative to a housing member of claim 14, wherein the first and second characteristic melting rates are substantially the same.

17. A method for positioning an electrical contact relative to a battery housing member comprising the steps of:

A) providing a first battery housing member and a second battery housing member, wherein the electrical contact is to be positioned with respect to the first battery housing member, and at least one of the battery housing members has a first energy director formed thereon, which first energy director has a first characteristic melting rate;

B) providing a positioning member having a first end and a second end, wherein:

i) the first end has a second energy director having a second characteristic melting rate; and ii) the second end has a third energy director having a third characteristic melting rate, wherein the third characteristic melting rate is slower than the second characteristic melting rate;

C) positioning the positioning member between the first and second battery housing members, with the first end of the positioning member being proximal to the electrical contact to be positioned;

D) applying ultrasonic energy to cause the first, second, and third energy directors to begin melting; and E) discontinuing imparting energy after the first energy director has substantially melted and the object is properly positioned, while the second energy director has not substantially melted.

* * * * *